US012276148B2

(12) United States Patent
Flogaus

(10) Patent No.: US 12,276,148 B2
(45) Date of Patent: Apr. 15, 2025

(54) FURNITURE DRIVE

(71) Applicant: Julius Blum GmbH, Hoechst (AT)

(72) Inventor: Alexander Simon Flogaus, Eriskirch (DE)

(73) Assignee: JULIUS BLUM GMBH, Hoechst (AT)

( * ) Notice: Subject to any disclaimer, the term of this patent is extended or adjusted under 35 U.S.C. 154(b) by 210 days.

(21) Appl. No.: 17/972,062

(22) Filed: Oct. 24, 2022

(65) Prior Publication Data

US 2023/0042204 A1 Feb. 9, 2023

Related U.S. Application Data

(63) Continuation of application No. PCT/AT2021/060134, filed on Apr. 22, 2021.

(30) Foreign Application Priority Data

May 7, 2020 (AT) .................................. 50391/2020

(51) Int. Cl.
*E05D 7/04* (2006.01)
*E05D 5/02* (2006.01)

(52) U.S. Cl.
CPC ......... *E05D 7/0407* (2013.01); *E05D 5/0276* (2013.01); *E05D 7/0415* (2013.01); *E05Y 2201/474* (2013.01); *E05Y 2900/20* (2013.01)

(58) Field of Classification Search
CPC ... E05D 7/0407; E05D 5/0276; E05D 7/0415; E05Y 2201/474; E05Y 2900/20
See application file for complete search history.

(56) References Cited

U.S. PATENT DOCUMENTS 5,035,026 A * 7/1991 Carlo ........................ E05D 3/16 16/302
7,735,943 B2 * 6/2010 Hottmann ............. E05F 1/1261 312/401

(Continued)

FOREIGN PATENT DOCUMENTS

JP 2019-522743 8/2019
WO 2009/108971 9/2009

(Continued)

OTHER PUBLICATIONS

International Search Report issued Aug. 27, 2021 in International (PCT) Application No. PCT/AT2021/060134.

*Primary Examiner* — Jason W San
*Assistant Examiner* — Matthew J Sullivan
(74) *Attorney, Agent, or Firm* — Wenderoth, Lind & Ponack, L.L.P.

(57) ABSTRACT

A furniture drive includes a housing to be arranged on a furniture panel, and an actuating arm assembly for moving the movable furniture part, and the actuating arm assembly includes an actuating arm movably-supported relative to the housing to be fixed to the movable furniture part. The actuating arm assembly is movable between a first relative position and a second relative position, and includes actuating arms pivotable relative to one another. A pivotal movement of the actuating arm assembly from the second relative position toward the first relative position can be blocked by a releasable blocking device including a movably supported blocking element movable between a blocking position and an unblocking position. A blocking element of the blocking device is supported on one of the actuating arms and includes an abutment bearing against a counter-abutment of the other of the actuating arms in the blocking position.

23 Claims, 7 Drawing Sheets

(56) References Cited

U.S. PATENT DOCUMENTS 7,810,213 B2 * 10/2010 Brustle .................... E05F 5/02 16/354
7,966,699 B2 * 6/2011 Dubach .................... E05D 3/14 16/259
7,987,558 B2 * 8/2011 Beckmann .......... E05D 11/0054 16/366
8,307,504 B2 * 11/2012 Collene .................... E05D 7/12 16/286
8,321,996 B2 * 12/2012 Hirtsiefer ................. E05F 5/02 16/354
8,468,653 B2 * 6/2013 Tumler ............... E05D 11/1007 49/246
8,713,760 B2 * 5/2014 Krudener .................. E05D 3/16 16/370
8,959,709 B2 * 2/2015 Hasegawa ................. E05F 5/00 16/50
9,032,768 B2 * 5/2015 Hauer .................. E05D 15/401 70/91
9,464,473 B2 * 10/2016 Baldreich ............. E05F 1/1058
9,498,062 B2 * 11/2016 Baldreich .............. A47B 96/00
9,528,307 B2 * 12/2016 Rohner ..................... E05D 3/16
9,701,275 B2 * 7/2017 Kim ........................ B60R 21/34
9,739,081 B2 * 8/2017 Stuke ........................ E05F 5/10
10,294,705 B2 * 5/2019 Hirtsiefer ............... E05D 11/00
10,352,081 B2 * 7/2019 Hirtsiefer .................. E05F 3/20
10,407,963 B2 * 9/2019 Salice .................. E05D 7/0415
10,494,846 B2 * 12/2019 Schmid ................. E05F 1/1261
10,662,690 B2 * 5/2020 Schluge ................ E05F 1/1253
10,704,307 B1 * 7/2020 Collene ................... E05D 11/10
10,731,392 B2 * 8/2020 Salice ..................... E05D 15/40
10,927,577 B2 * 2/2021 Kruedener ............ E05D 5/0276
10,968,672 B2 * 4/2021 Schmid ................. E05F 1/1261
11,028,627 B2 * 6/2021 Øhlenschlæger ......... E05D 3/18
11,111,708 B2 * 9/2021 Kruedener ................ E05D 3/06
11,319,737 B2 * 5/2022 Nordieker ............... E05D 15/40
11,319,740 B2 * 5/2022 Byun .................... E05F 1/1269
11,384,577 B2 * 7/2022 Hammerer .............. E05D 3/142
11,519,208 B2 * 12/2022 Kruedener ............ E05D 5/0215
11,808,074 B2 * 11/2023 Hirtsiefer .............. E05F 1/1261
12,000,188 B2 * 6/2024 Schmid ................... E05D 15/40
12,116,819 B2 * 10/2024 Baldreich ............... E05D 7/125
2008/0168793 A1 7/2008 Hottmann
2012/0079684 A1 4/2012 Tumler
2019/0061679 A1 * 2/2019 Gabler .................... E05D 3/145
2019/0106918 A1 * 4/2019 Schmid ................. E05F 1/1261
2019/0316396 A1 10/2019 Kruedener et al.
2022/0074248 A1 * 3/2022 Holzapfel ............... E05D 15/40
2022/0120123 A1 * 4/2022 Schmid ...................... E05D 3/06
2023/0088619 A1 * 3/2023 Cai ........................... E05F 1/10 16/382
2023/0250684 A1 * 8/2023 Scherl ................... E05F 1/1058 16/221
2023/0272649 A1 * 8/2023 Baldreich ............. E05D 5/0276 312/325
2023/0349213 A1 * 11/2023 Salice ....................... E05D 5/02
2024/0263500 A1 * 8/2024 Geller ................... E05D 5/0276
2024/0279971 A1 * 8/2024 Zetti ..................... E05F 1/1261

FOREIGN PATENT DOCUMENTS

WO 2011/011800 2/2011
WO 2017/219054 12/2017

* cited by examiner

FURNITURE DRIVE

BACKGROUND OF THE INVENTION

The present invention relates to a furniture drive for moving a furniture part movably-supported relative to a furniture carcass, in particular a furniture flap pivotable relative to the furniture carcass about a horizontally extending axis. The furniture drive comprises:

- a housing to be arranged on or within a furniture panel of the furniture carcass,
- an actuating arm assembly for moving the movable furniture part, the actuating arm assembly including at least one actuating arm, the at least one actuating arm being movably-supported relative to the housing and being configured to be fixed to the movable furniture part, wherein the actuating arm assembly is movable at least between a first relative position corresponding to a closed position of the movable furniture part, and a second relative position corresponding to a fully open position of the movable furniture part,
- a releasable blocking device, wherein the actuating arm assembly includes at least two actuating arms pivotable relative to one another, and wherein a pivotal movement of the actuating arm assembly from the second relative position in a direction of the first relative position can be blocked by the at least one blocking device, wherein the releasable blocking device includes at least one movably, preferably pivotally, supported blocking element configured to be moved between a blocking position and at least one unblocking position, wherein a movement of the actuating arm assembly between the first relative position and the second relative position can be unblocked in the unblocking position.

Moreover, the invention concerns an item of furniture comprising a furniture carcass, a furniture part movably-supported relative to the furniture carcass, and a furniture drive of the type to be described for moving the movably-supported furniture part.

WO 2011/011800 A2 discloses an actuating drive comprising a movably-supported actuating arm for moving a furniture flap. The actuating drive includes a spring device for applying a force to the actuating arm, and a locking device for releasably locking the actuating arm in a pivotal position relative to the housing of the actuating drive. By the locking device, a dangerous kicking-out movement of the actuating arm, caused by a force of the spring device, in a direction of the open position can be prevented. The locking device is configured such that the locking of the actuating arm can only be released when the movable furniture part has been duly connected to the actuating arm. In the locked position, the actuating arm is blocked in both directions of movement, possibly with a slight play. As a result, the mounting operation of the movable furniture part to the actuating arm can be impeded.

SUMMARY OF THE INVENTION

It is an object of the present invention to propose a furniture drive mentioned in the introductory part, thereby avoiding the above-discussed drawbacks.

According to the invention, the at least one blocking element of the blocking device is supported on one of the at least two actuating arms and has an abutment configured to bear against a counter-abutment of the other of the at least two actuating arms in the blocking position of the at least one blocking element and in a blocking angle position of the actuating arm assembly relative to the housing. The actuating arm assembly is freely movable between the second relative position and the blocking angle position, and a pivotal movement of the actuating arm assembly from the second relative position in a direction of the first relative position beyond the blocking angle position is blocked.

In other words, the actuating arm assembly is freely movable between the second relative position (corresponding to the fully open position of the movable furniture part) and the blocking angle position (in which a further movement of the actuating arm assembly in a direction of the first relative position, thus in a direction of the fully closed position of the furniture part, is prevented by the blocking device).

In this way, the mounting flexibility can be improved when the movable furniture part is mounted, because the actuating arm assembly can be variably positioned by a user between the second relative position and the blocking angle position. Therefore, the actuating arm assembly can be brought into a comfortable position when the movable furniture part is to be mounted. As a result, a plurality of positions of the actuating arm assembly are available for a user, in which the movable furniture part can be connected to the actuating arm.

According to an embodiment, the at least one blocking element of the blocking device is pre-stressed by a force storage member, preferably in a direction of the unblocking position. In this way, the blocking element can be immediately moved into the unblocking position by a force of a force storage member, provided that no forces are applied to the blocking element.

According to a further embodiment, the releasably blocking device includes at least two movably, preferably pivotally, supported blocking elements configured to be moved relative to one another between a blocking position and at least one unblocking position. In the blocking position of the blocking elements and in the blocking angle position of the actuating arm assembly relative to the housing, a pivotal movement of the actuating arm assembly from the second relative position in a direction of the first relative position beyond the blocking angle position is blocked.

According to a further embodiment, the at least two blocking elements of the blocking device bear against one another in the blocking position and/or are mutually spaced from one another in the unblocking position.

According to a further embodiment, at least one actuating device is provided, the actuating device being connected or being configured to be releasably connected to the at least one actuating arm. By the actuating device, the actuating arm assembly can be moved from the first relative position into the second relative position. Preferably, the at least one blocking element or the blocking elements of the blocking device can be moved from the blocking position into the unblocking position by mounting the actuating device or by mounting a fitting element configured to be connected to the movable furniture part.

In other words, an actuating device in the form of an opening aid is provided. The actuating device is connected or is configured to be releasably connected to the at least one actuating arm. With the aid of the actuating device, the at least one actuating arm—in a connected condition with the actuating device—can be moved from a closed position, in which the at least one actuating arm is arranged within the housing, into an open position, in which the at least one actuating arm is located outside the housing.

Accordingly, the entire actuating arm assembly of the furniture drive, in a delivery condition, can be located in the compact first relative position, in which the actuating arm assembly is located within the housing. After the furniture drive has been mounted to the furniture carcass in its compact delivery condition, an operator can bring out the at least one actuating arm from the housing with the aid of the actuating device, namely such that the operator applies a manual force (preferably a manual pulling force) to the actuating device connected to the actuating arm.

The actuating device is, in particular, of advantage when the housing of the furniture drive is entirely received within a furniture panel of the furniture carcass in a mounted condition. Without the presence of the actuating device, an operator would have to try to pry out the at least one actuating arm from the housing, for example with the aid of a screwdriver. This procedure might be very dangerous, in particular when a spring device is provided for applying a force to the actuating arm assembly. The actuating arm could then kick out by a force of the spring device in a direction of the open position in an uncontrolled manner, and there is a considerable risk of injuries to persons and damages to objects. Moreover, prying out the actuating arm from the housing brings the danger that the actuating arm assembly can be damaged, in particular scratched, by improperly positioning the tool.

According to an embodiment, the at least one actuating device includes at least one recess for receiving a tool, preferably a screwdriver. Accordingly, a tool, preferably a screwdriver, can be introduced into the provided recess of the actuating device. The actuating arm connected to the actuating device can then be moved into its open position outside the housing in a controlled manner with the aid of the extended lever arm formed by the screwdriver. This is, in particular, of an advantage when the actuating arm assembly of the furniture drive is pressurized by a force of a spring device, as already mentioned before. In this way, a controlled opening movement of the actuating arm assembly can be afforded by applying a counterforce with the aid of the screwdriver.

According to an embodiment:

- the actuating arm assembly is pressurized by the spring device within a first pivotal angle range in a direction of the first relative position, and is pressurized by the spring device within a second pivotal angle range in a direction of the second relative position, and/or
- the spring device includes at least one helical spring, preferably at least one compression spring.

The item of furniture according to the invention comprises a furniture carcass, a furniture part movably-supported relative to the furniture carcass, in particular a furniture flap configured to pivot relative to the furniture carcass about a horizontally extending axis, and a furniture drive of the type in question for moving the movably-supported furniture part. According to an embodiment, the housing of the furniture drive is substantially entirely received within the furniture panel of the furniture carcass.

BRIEF DESCRIPTION OF THE DRAWINGS

Further details and advantages of the present invention will be described with the aid of the following description of figures.

DETAILED DESCRIPTION OF THE INVENTION

Figure 1A:
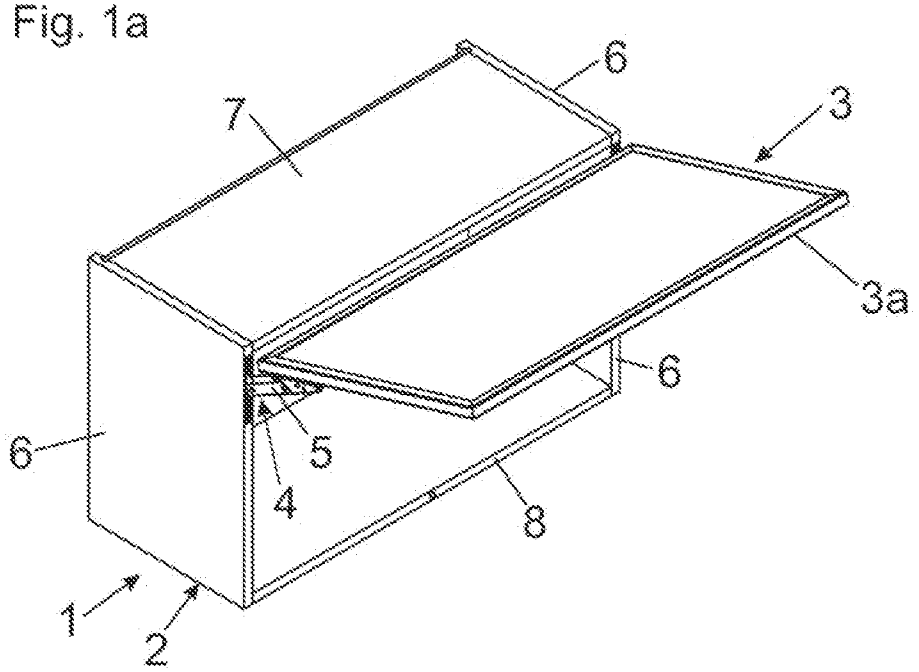
FIG. 1*a*, 1 *b* show an item of furniture with a movable furniture part in a perspective view and in an exploded view.

FIG. 1*a* shows a perspective view of an item of furniture 1 comprising a furniture carcass 2, a furniture part 3 movably-supported relative to the furniture carcass 2, and at least one furniture drive 4 for moving the movable furniture part 3. The item of furniture 1 includes furniture panels 6 in the form of sidewalls, a top panel 7 and a bottom panel 8. For example, the movable furniture part 3 can be in the form of a furniture flap 3*a* configured to pivot relative to the furniture carcass 2 about a horizontally extending axis.

In the shown embodiment, the housing 9 of the furniture drive 4 is at least partially, preferably substantially entirely, integrated into the furniture panel 6 configured as a sidewall. The movable furniture part 3 is movably supported between a closed position in which the furniture carcass 2 is covered, and an elevated position relative to the furniture carcass 2.

Of course, it is also possible to integrate the furniture drive 4 within a horizontally extending furniture panel, thus within the top panel 7, within the bottom panel 8 and/or within a shelf 13 (FIG. 2*a*-2*d*) arranged between the top panel 7 and the bottom panel 8 for example. In such a case, the movable furniture part 3 is pivotally supported relative to the furniture carcass 2 about a vertically extending axis in the mounted position.

The furniture drive 4 includes an actuating arm assembly 5 for moving the movable furniture part 3, and further includes at least one spring device 10 (FIG. 1*b*) for applying a force to the actuating arm assembly 5.

Figure 1B:
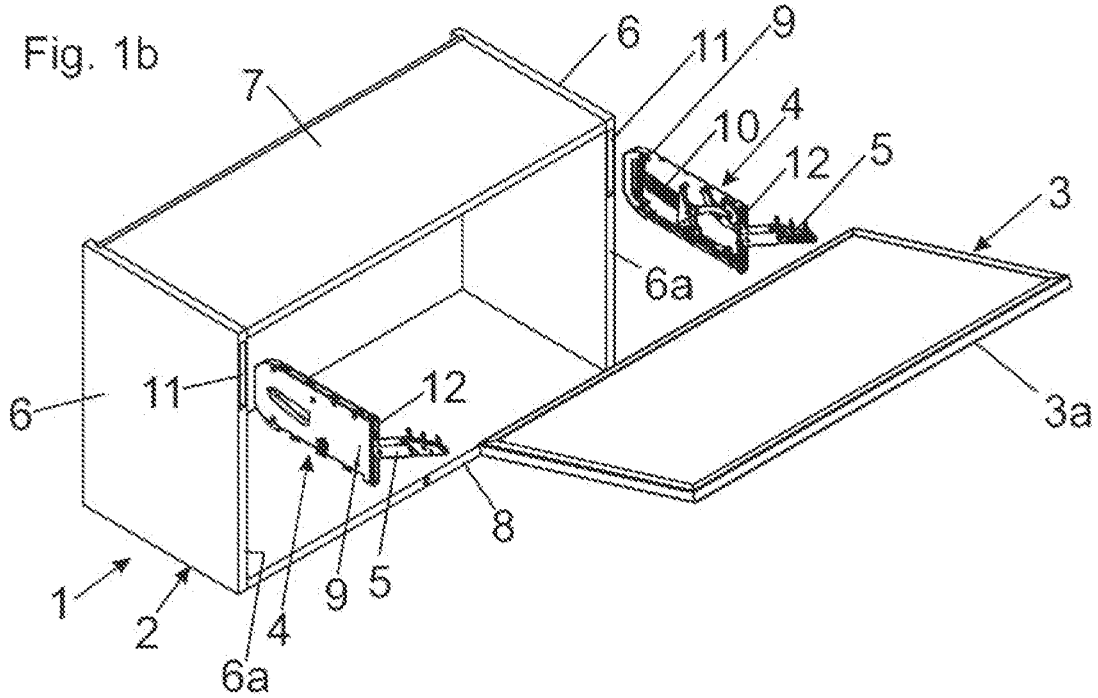

FIG. 1*b* shows the item of furniture 1 in an exploded view, in which two furniture drives 4, preferably identical in construction, are provided for moving the movable furniture part 3. Each of the furniture drives 4 includes a housing 9 configured to be fixed to the furniture carcass 2. According to an embodiment, the housing 9 of the furniture drive 4 is at least partially, preferably substantially entirely, received within a recess 11 of the furniture panels 6 configured as sidewalls. In a mounted condition, the housing 9 can be arranged substantially flush with a front face 6*a* of the furniture panel 6.

The recess 11 is configured as a blind hole for example. Upon mounting, the housing 9 can be inserted from the front (that is to say, from the narrow front face 6*a* of the furniture panel 6) into the pocket-shaped recess 11 of the furniture panel 6. In a mounted condition, the furniture drive 4 is received within a predetermined wall thickness of the furniture panel 6.

At least one spring device 10 for applying a force to the actuating arm assembly 5 is arranged on or within the housing 9. A cover 12 is provided on a front-end region of the housing 9, and at least one movably-supported actuating arm 5*a*, 5*b*, 5*c*, 5*d* (FIG. 2*d*) of the actuating arm assembly 5 can be guided through the cover 12 in a relative position.

FIG. 2*a*-2*d* show the item of furniture 1 with the furniture carcass 2, and the housing 9 of the furniture drive 4 is substantially entirely received within the furniture panel 6. The item of furniture 1, besides the top panel 7 and the bottom panel 8, can have an additional shelf 13. The actuating arm assembly 5 for moving the movable furniture part 3 is thereby entirely received within the housing 9 of the furniture drive 4. Therefore, the furniture drive 4, in its delivery condition, adopts a very compact construction. In this way, the packaging sizes for the furniture drive 4 can be reduced, and the actuating arm assembly 5 can be protected from damages.

In order for the actuating arm assembly 5 to be moved out from the housing 9 of the furniture drive 4, an actuating device 14 is provided. The actuating device 14 can be configured as a component separate from the actuating arm assembly 5, and the actuating device 14 is configured to be connected to the at least one actuating arm 5*a* (FIG. 2*c*, FIG. 2*d*) of the actuating arm assembly 5.

The housing 9 of the furniture drive 4 includes a front-sided opening 17, and the at least one actuating arm 5*a* can be guided through the opening 17. According to an embodiment, the front-sided opening 17 of the housing 9 can be substantially entirely covered by the actuating device 14. In this way, the ingress of dirt or dust into the interior of the housing 9 can be reduced.

Figure 2A:
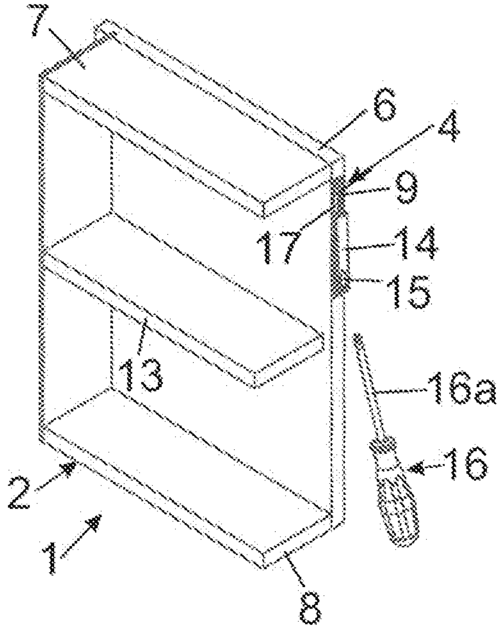
FIG. 2*a*-2*d* show a temporal sequence of an opening movement of the actuating arm assembly of the furniture drive with the aid of the actuating device.
Figure 2B:
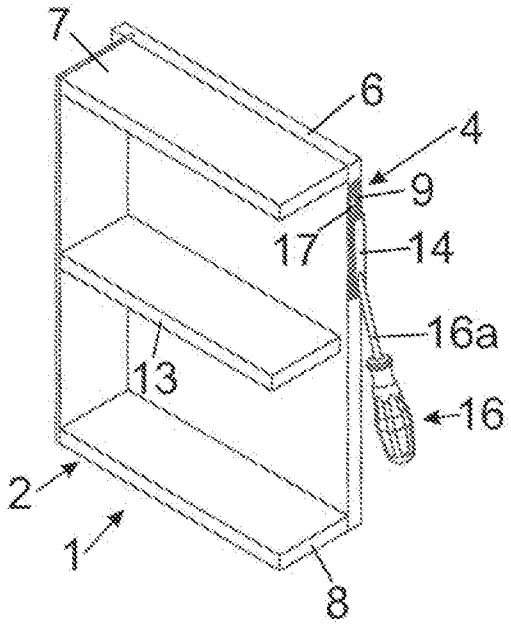

The actuating device 14 includes a recess 15 for receiving a tool 16, preferably a screwdriver 16*a*. By introducing the screwdriver 16*a* into the recess 15 and by subsequently lifting the screwdriver 16*a*, the actuating device 14 (jointly with the at least one actuating arm 5*a*) can be moved out from the housing 9 of the furniture drive 4 (FIG. 2*b*, FIG. 2*c*).

The actuating arm assembly 5 is movably supported between a first relative position, in which the at least one actuating arm 5*a* is arranged within the housing 9, and a second relative position, in which the at least one actuating arm 5*a* is arranged outside the housing 9.

Usually, the actuating arm assembly 5 is pressurized by the spring device 10 within a first pivotal angle range in a direction of the first relative position, and is pressurized by the spring device 10 within a second pivotal angle range in a direction of the second relative position. This means that the spring device 10, in a closing range of the actuating arm 5*a* immediately preceding the fully closed position, applies a closing force to the at least one actuating arm 5*a*. Accordingly, a manual force against a force of the spring device 10 muss be firstly exerted so as to move the actuating arm assembly 5 from the first relative position (closed position) in a direction of the second relative position (open position).

Figure 2C:
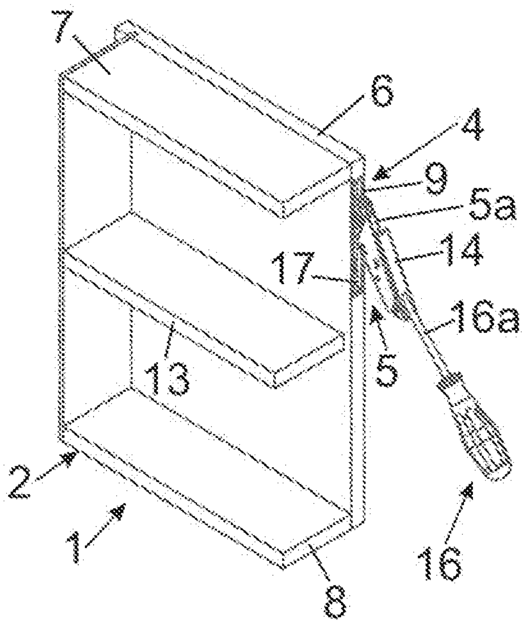

FIG. 2*c* shows the item of furniture 1 in a further open position of the actuating arm assembly 5. From this relative position, the spring device 10 applies an opening force to the actuating arm assembly 5. An operator can thus prevent an uncontrolled kicking-out movement of the at least one actuating arm 5*a*, namely by applying a manual force against the force of the spring device 10 with the aid of the screwdriver 16*a* introduced into the recess 15.

Figure 2D:
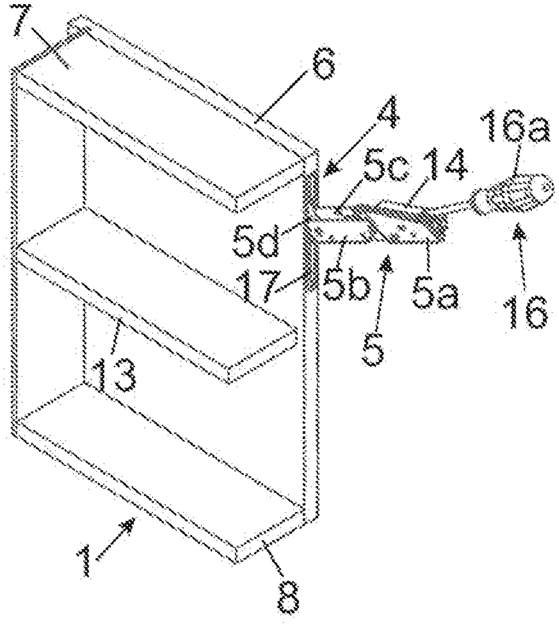

In FIG. 2*d*, the actuating arm assembly 5 of the furniture drive 4 is in a fully opened condition. The actuating device 14 can now be separated from the actuating arm 5*a* and can be recycled for example.

Figure 3A:
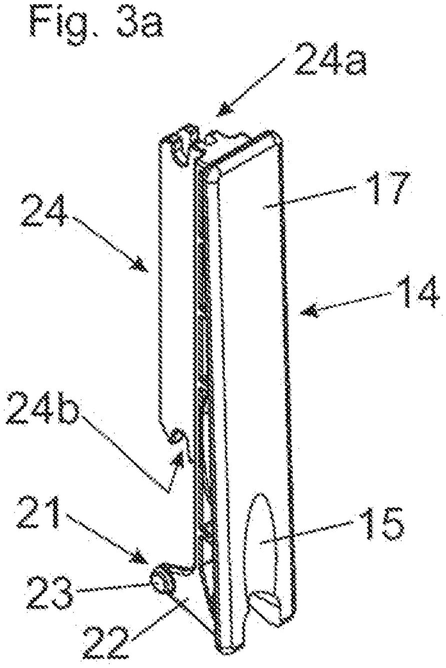
FIG. 3*a*-3*d* show the actuating device in different views.
Figure 3B:
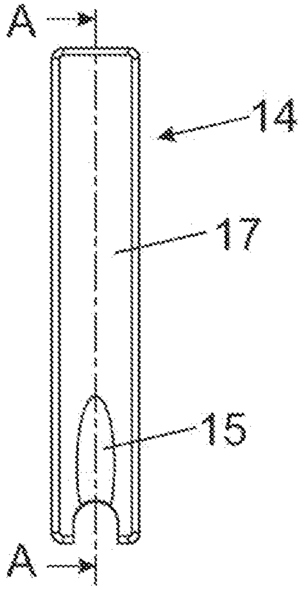
Figure 3C:
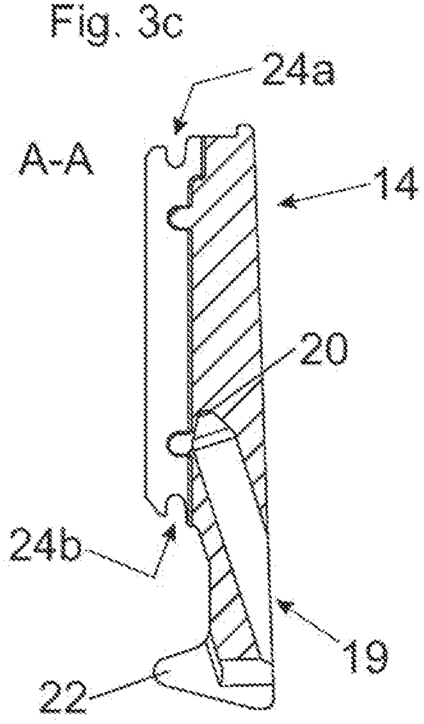

FIG. 3*a*-3*d* show the actuating device 14 in different views. FIG. 3*a* shows a perspective view of the actuating device 14. FIG. 3*b* shows the actuating device 14 in a view from the front. FIG. 3*c* shows a cross-sectional view of the actuating device 14 along the plane A-A depicted in FIG. 3*b*.

Figure 3D:
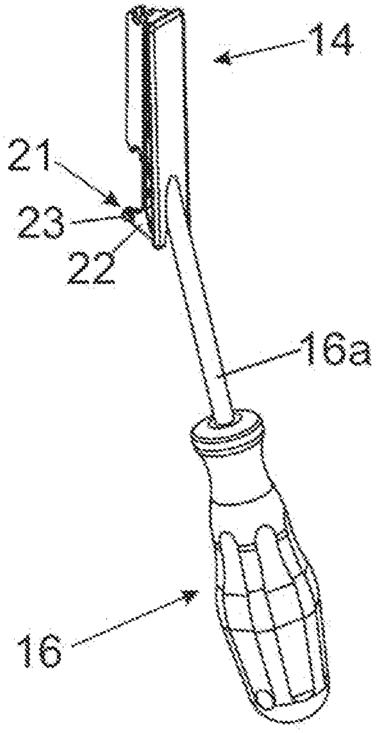

FIG. 3*d* shows a perspective view of the screwdriver 16*a* introduced into the recess 15.

Preferred embodiments:

- the actuating device 14 includes a flat-shaped visible (front) side 17, the visible side 17 facing away from the at least one actuating arm 5*a* in a mounted condition of the actuating device 14, and/or
- the at least one recess 15, in the first relative position of the actuating arm assembly 5, extends inclinedly (see FIG. 3*c*) to a plane formed by the front-sided opening (i.e., a place of the visible front side 17) (FIG. 2*a*-2*d*) of the housing 9, and/or
- the at least one recess 15 has an insertion opening 19 (FIG. 3*c*) and an abutment 20 for the tool 16, the insertion opening 19 and the abutment 20 being mutually spaced from one another, the at least one actuating arm 5*a* is pivotally supported about at least one hinge axis 25 (FIG. 4*a*), and the abutment 20, in the first relative position of the actuating arm assembly 5, is arranged closer to the at least one hinge axis 25 than the insertion opening 19, and/or
- the at least one recess 15 is configured substantially cylindrical and/or conical, and/or
- the actuating arm assembly 5 includes at least one actuating arm 5*a* configured to be connected to the movable furniture part 3, and a tool 16 configured to be received within the at least one recess 15 can be arranged in an extension of the actuating arm 5*a*.

By a latching device 21, the actuating device 14 can be releasably latched relative to the housing 9 of the furniture drive 4 in the first relative position of the actuating arm assembly 5. Preferably:

- the at least one latching device 21 includes at least one spring tongue 22, preferably at least two spring tongues 22 mutually spaced from one another, and/or
- the at least one latching device 21 includes at least one recess 29 (FIG. 5*a*, 5*b*) and at least one latching element 23 configured to be arranged within the at least one recess 29, the at least one latching element 23 being arranged on the at least one actuating device 14 and the at least one recess 29 being arranged on or within the housing 9 of the furniture drive 4, or vice versa.

Moreover, a locking device 24 is provided for connecting the at least one actuating device 14 or, alternatively, a fitting element configured to be releasably connected to the movable furniture part 3, to the at least one actuating arm 5*a*, preferably wherein the at least one locking device 24

- includes at least one resilient or a spring-loaded locking element 26 (FIG. 4*b*) and at least one recess 24*b* for receiving the locking element 26, the locking element 26 being arranged on the at least one actuating arm 5*a* and the recess 24*b* being arranged on the actuating device 14 or on the fitting element, or vice versa, and/or
- includes at least one holding pin 28 (FIG. 4*b*) and at least one notch 24*a* for receiving the holding pin 28, the holding pin 28 being arranged on the at least one actuating arm 5*a* and the notch 24*a* being arranged on the actuating device 14 or on the fitting element, or vice versa, and/or
- includes at least one resilient or a spring-loaded locking element 26 (FIG. 4*b*) and at least one holding pin 28 (FIG. 4*b*) spaced from the at least one locking element 26.

The fitting element is not explicitly shown in the figures. However, the fitting element, as commonly known, is configured for the releasable connection, in particular for the tool-free connection, to the at least one actuating arm 5*a* of the actuating arm assembly 5.

Figure 4A:
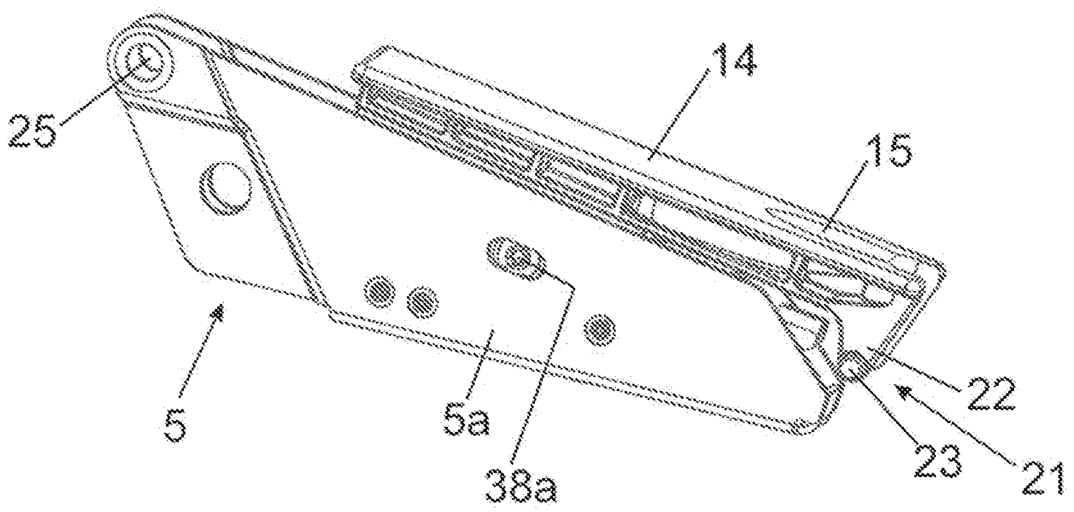
FIG. 4*a*, 4*b* show the actuating device connected to the actuating arm in a side view and in a cross-sectional view.

FIG. 4*a* shows the actuating arm 5*a* of the actuating arm assembly 5 in a connected condition with the actuating device 14, the actuating arm 5*a* being pivotable about the hinge axis 25. The actuating device 14 is configured to be releasably locked to the actuating arm 5*a* via the locking device 24.

Figure 4B:
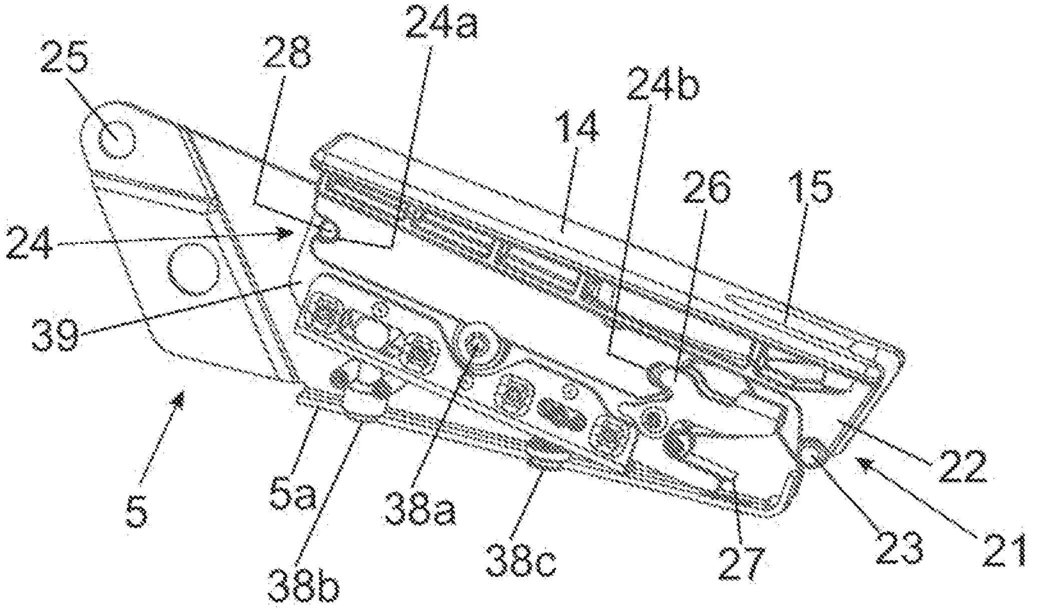

FIG. 4*b* shows a cross-sectional view of the arrangement according to FIG. 4*a*, in which the locking device 24 is shown in greater detail. For mounting the actuating device 14, the holding pin 28 of the actuating arm 5*a* is initially introduced into the notch 24*a* of the actuating device 14. In an engaged condition, the actuating device 14 is pivoted, and can be subsequently releasably locked by the movably-supported locking element 26. The locking element 26 arranged on the actuating arm 5*a* is pressurized by a force storage member 27, for example by a leaf spring, in a direction of a locked position. In a locked condition, the locking element 26 of the actuating arm 5*a* engages into the recess 24*b* of the actuating device 14.

The at least one actuating arm 5*a* includes at least one mounting member 39 configured to be fixed to the movable furniture part 3, and at least one adjustment device 38*a*, 38*b*, 38*c* for adjusting a position of the at least one mounting member 39 relative to the at least one actuating arm 5*a*. In the shown embodiment, the at least one actuating arm 5*a* includes three adjustment devices 38*a*, 38*b*, 38*c* with three rotatably-supported operating elements. By the adjustment devices 38*a*, 38*b*, 38*c*, a position of the furniture part 3 relative to the actuating arm 5*a* can be adjusted in a three-dimensional manner in a connected condition of the movable furniture part 3.

By the first adjustment device 38*a*, a position of the actuating device 14 (or, alternatively, a position of the fitting element configured to be fixed to the movable furniture part 3) can be adjusted in a lateral direction relative to the actuating arm 5*a*. By the second adjustment device 38*b*, an inclination of the mounting member 39 relative to the actuating arm 5*a* can be adjusted. By the third adjustment device 38*c*, a height position of the mounting member 39 relative to the actuating arm 5*a* can be adjusted.

Figure 5A:
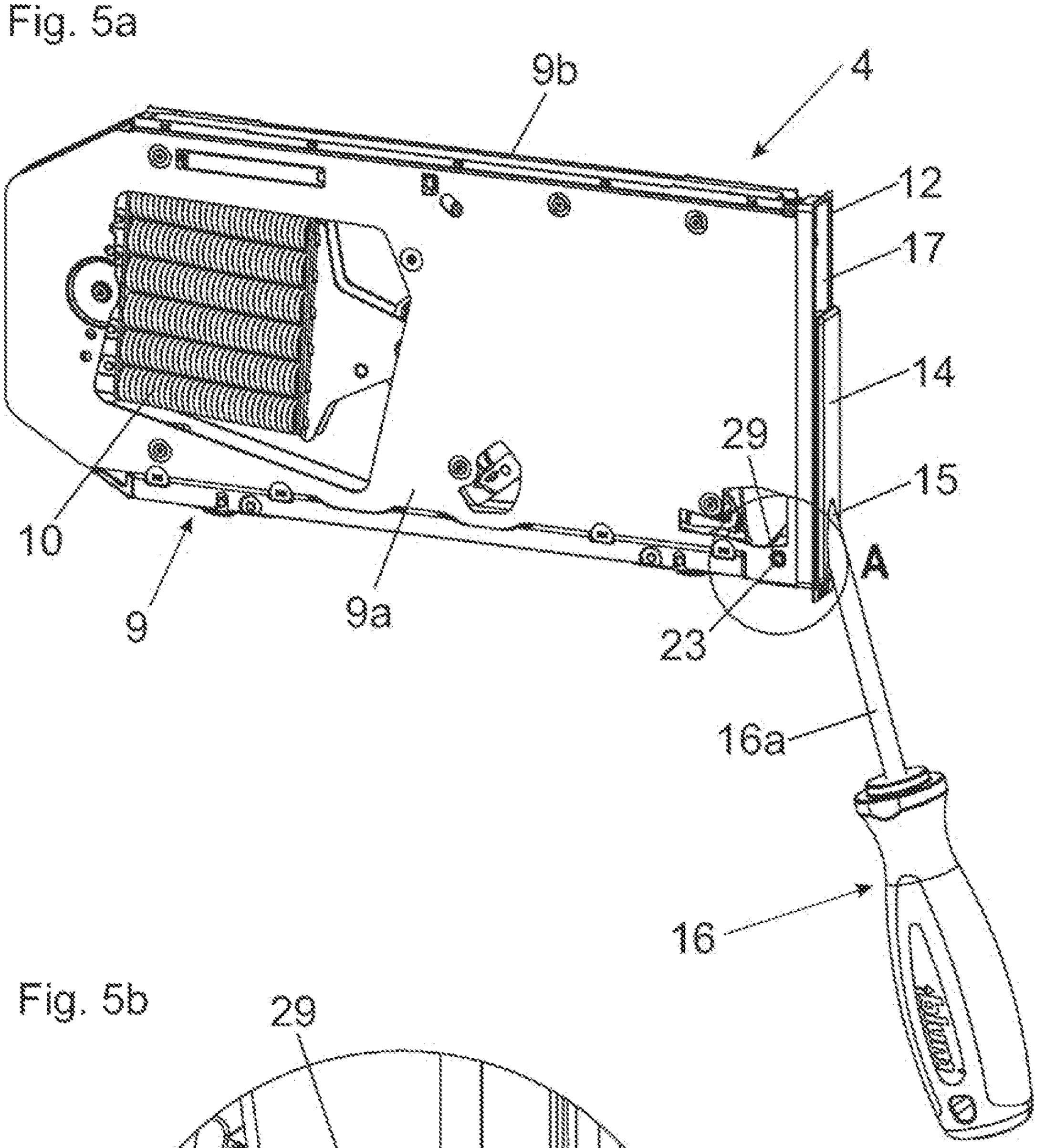
FIG. 5*a*, 5*b* show a perspective view of the furniture drive and an enlarged detail view thereof.

FIG. 5*a* shows the furniture drive 4 in a perspective view. The housing 9 of the furniture drive 4 includes two substantially flat-shaped housing walls 9*a*, 9*b* mutually spaced from each other in a parallel relationship. The actuating arm assembly 5, in its first relative position, is entirely received between the two housing walls 9*a*, 9*b*. The spring device 10 for applying a force to the actuating arm assembly 5 can also be seen. The spring device 10 can include, for example, a spring assembly having a plurality of helical springs, preferably compression springs, switched in a parallel relationship to one another.

At least one recess 29 is provided on the housing 9, the recess 29 being configured to receive the latching element 23 (FIG. 3*a*) of the actuating device 14. In this way, an undesired opening movement of the actuating arm assembly 5 can be prevented. This is, in particular, advantageous when the spring device 10, in the closing region of the at least one actuating arm 5*a*, does not apply a closing force to the at least one actuating arm 5*a*, but does rather apply a torque acting in opening direction to the at least one actuating arm 5*a* also in the closing region.

According to an embodiment, the actuating device 14 includes at least two latching elements 23 separate from one another. A first latching element 23 of the actuating device 14 is configured to be received in a first recess 29 of the first housing wall 9*a*. A second latching element 23 of the actuating device 14 is configured to be received in a second recess 29 of the second housing wall 9*b*. In this way, the actuating device 14 can be locked in a tilt-proof manner in relation to the housing 9.

Figure 5B:
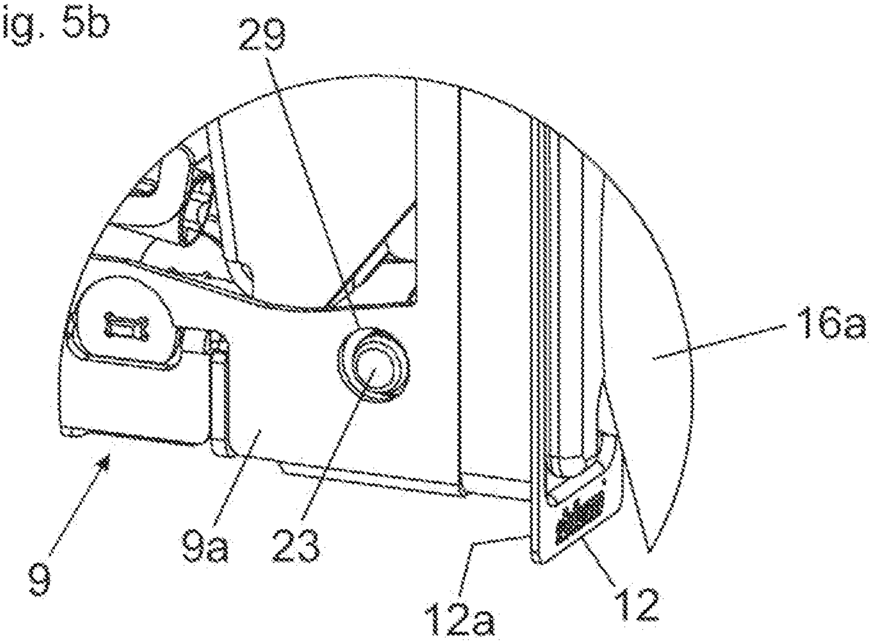

FIG. 5*b* shows the encircled region of FIG. 5*a* in an enlarged view. The latching element 23 can be configured so as to be cylindrical at least over a region, and can be received in a circular recess 29 of the housing 9. The locking between the latching element 23 and the recess 29 can be released by applying a manual pulling force to the actuating element 14, whereby the latching element 23 can be moved out from the recess 29 against a resilient action of the latching element 23. The at least one latching element 23 is movably supported in a direction extending substantially perpendicular to a plane formed by the housing walls 9*a*, 9*b*.

In FIG. 5*b*, it can further be seen that a cover 12 is provided on the housing 9 of the furniture drive 4. The cover 12 includes at least one laterally protruding and substantially annular-shaped flange 12*a*. The flange 12*a* forms a depth-abutment for the housing 9 of the furniture drive 4, the flange 12*a* being configured to bear against the front face 6*a* (FIG. 1*b*) of the furniture panel 6. As a result, the housing 9 adopts a defined depth position relative to the furniture panel 6 in a mounted condition. Moreover, the flange 12*a* is configured to cover a gap formed between the housing 9 and an inner wall of the recess 11 (FIG. 1*b*) in a mounted condition of the furniture drive 4.

Figure 6A:
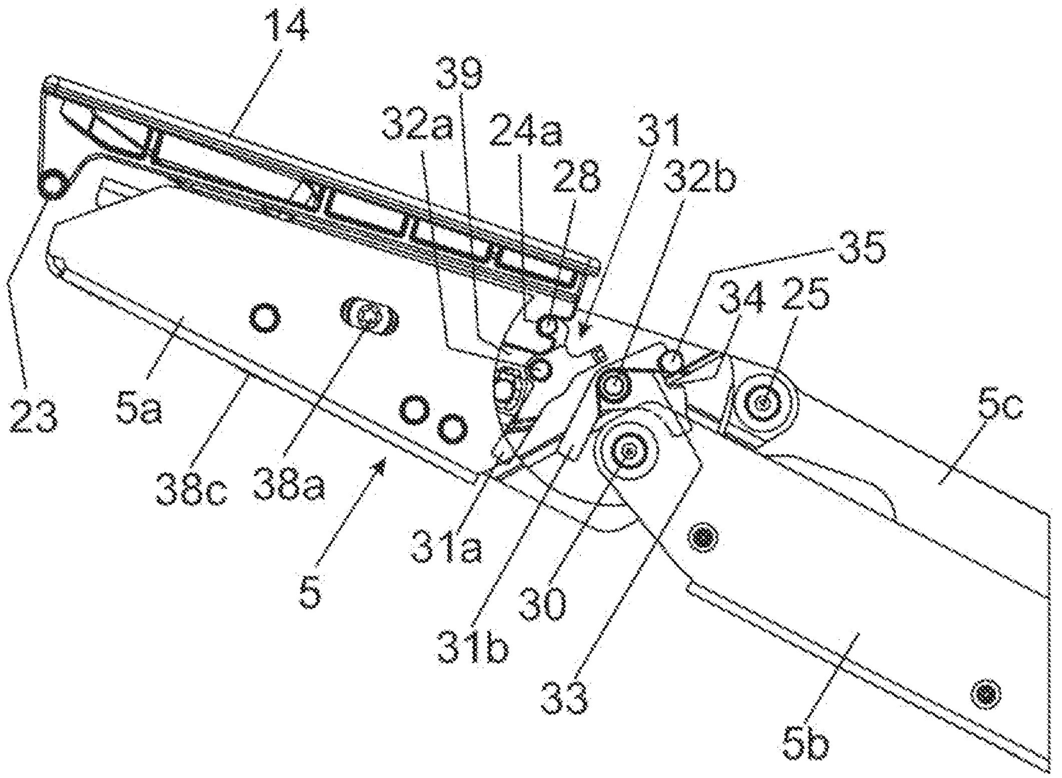
FIG. 6*a*, 6*b* show the actuating device connected to the actuating arm in a side view and in a cross-sectional view.

FIG. 6*a* shows a portion of the actuating arm assembly 5, in which the at least one first actuating arm 5*a* is hingedly connected to a second actuating arm 5*b* via a first hinge axis 30, and is hingedly connected to a third actuating arm 5*c* via a second hinge axis 25.

The furniture drive 4 includes a releasable blocking device 31, and a pivotal movement of the actuating arm assembly 5 from the second relative position in a direction of the first relative position can be blocked by the releasable blocking device 31.

The releasable blocking device 31 includes at least two movably-supported blocking elements 31*a*, 31*b*. Preferably, the blocking elements 31*a*, 31*b* are pivotable about pivoting axes 32*a*, 32*b*. The blocking elements 31*a*, 31*b* are movably-supported relative to one another between a blocking position and at least one unblocking position. In the blocking position of the blocking elements 31*a*, 31*b*, a movement of the actuating arm assembly 5 between the first relative position and the second relative position can be blocked. In the unblocking position of the blocking elements 31*a*, 31*b*, a movement of the actuating arm assembly 5 between the first relative position and the second relative position can be unblocked. The at least two blocking elements 31*a*, 31*b* of the blocking device 31 bear against one another in the blocking position, and/or are mutually spaced from one another in the unblocking position. At least one blocking element 31*a*, 31*b*, preferably both blocking elements 31*a*, 31*b*, can be configured as a double-armed lever having two lever ends.

The first actuating arm 5*a* includes at least one mounting member 39 configured to be fixed to the movable furniture part 3, and at least one adjustment device 38*a*, 38*b*, 38*c* for adjusting a position of the at least one mounting member 39 relative to the at least one actuating arm 5*a*. At least one blocking element 31*a* of the blocking device 31 is movably supported, preferably pivotally supported, on the at least one mounting member 39.

Figure 6B:
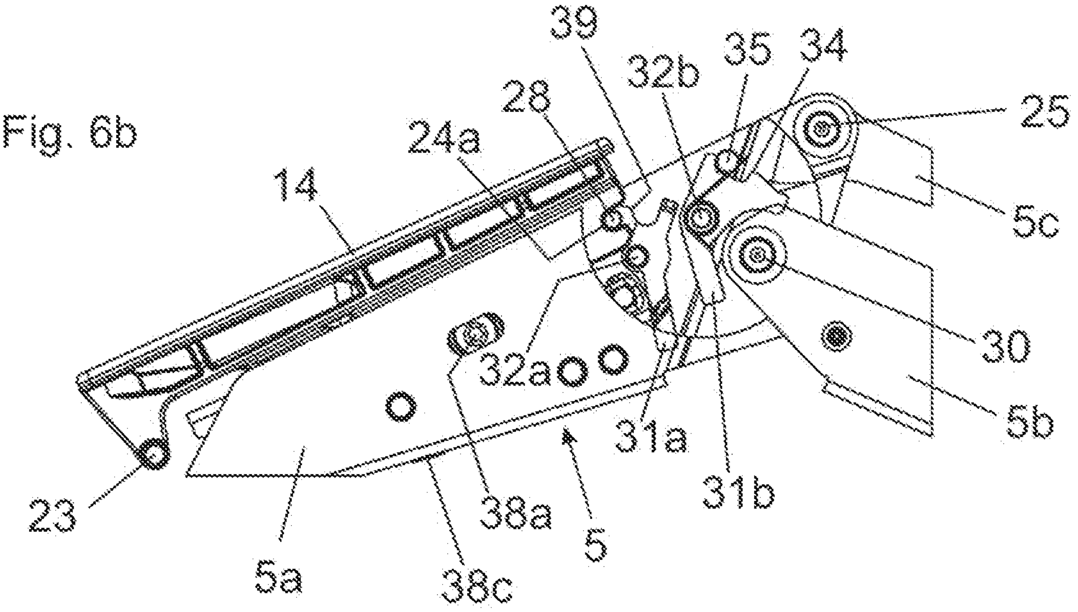

In the shown FIGS. 6*a*, 6*b*, the blocking elements 31*a*, 31*b* are located in the unblocking position, so that a movement of the actuating arm assembly 5 between the first relative position and the second relative position can be made possible. The unblocking position is present, because the actuating device 14 is duly connected to the first actuating arm 5*a*. This is evident because the holding pin 28 of the first actuating arm 5*a* engages into the notch 24*a* of the actuating device 14.

The first blocking element 31*a* is pivotally supported about a first pivoting axis 32*a*. The first blocking element 31*a* is pre-stressed by a force storage member 33 (not shown here) about the first pivoting axis 32*a* in a counter-clockwise direction and thus bears against the actuating device 14 by a force of the force storage member 33.

The second blocking element 31*b* is pivotally supported about a second pivoting axis 32*b*. The second blocking element 31*b* is pre-stressed by the shown force storage member 33 about the second pivoting axis 32*b* in a clockwise direction and thus bears against a support element 35 of the actuating arm 5*a* by a force of the force storage member 33.

In a duly connected condition between the actuating device 14 and the first actuating arm 5*a*, the two blocking elements 31*a*, 31*b* are mutually spaced from one another, so that a movement of the actuating arm assembly 5 between the first relative position and the second relative position is unblocked. In the unblocking position, the blocking elements 31*a*, 31*b* are mutually spaced from one another in all relative positions of the actuating arm assembly 5. This can be seen in FIGS. 6*a*, 6*b*.

Figure 7A:
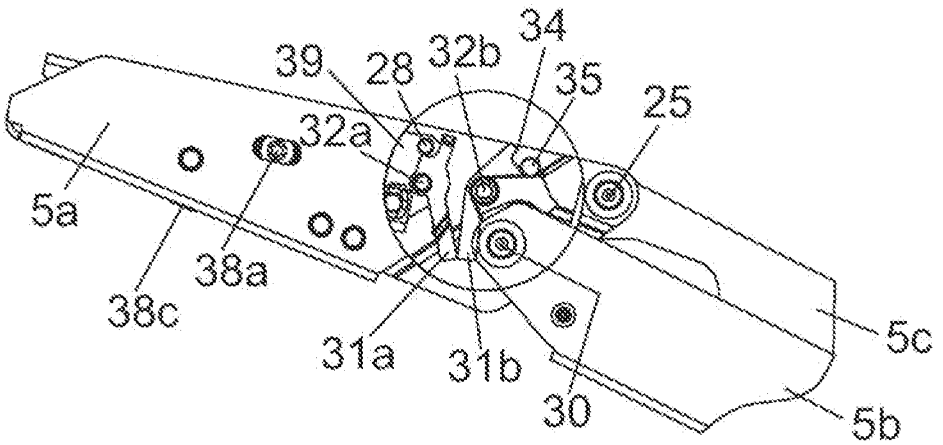
FIG. 7*a*-7*d* show the actuating arm assembly in two different relative positions and enlarged detail views thereof.

FIG. 7*a*, on the contrary, shows the separated condition between the actuating device 14 and the at least one actuating arm 5*a*. Therefore, the releasable blocking device 31 is located in a blocking position. In the blocking position, a movement of the actuating arm assembly 5 between the first relative position and the second relative position can be blocked or at least be limited. The separated condition between the actuating device 14 and the actuating arm 5*a* can be seen, because the holding pin 28 of the first actuating arm 5*a* no longer engages into the notch 24*a* of the actuating device 14.

In the shown FIG. 7*a*, the actuating arm assembly 5 is located in a fully-open condition relative to the housing 9 of the furniture drive 4. By an adjustment device known according to the prior art, the location of the maximum open position of the actuating arm assembly 5 relative to the housing 9 can be adjusted. In this way, the flexibility can be improved when the movable furniture part 3 is to mounted to the first actuating arm 5*a*, because the actuating arm assembly 5 can be moved into a comfortable position for the operator due to a variable adjustment of the maximum open position.

The releasable blocking device 31 is provided so as to prevent a tensioning of the spring device 10 by a movement of the actuating arm assembly 5, starting from the second relative position (open position) into the first relative position (closed position), as long as a movable furniture part 3 is not connected to the actuating arm 5*a*. As long as the movable furniture part 3 is not connected to the actuating arm 5*a*, there is no counterweight acting against the spring device 10. Therefore, it would be possible that the actuating arm 5*a*, when not connected to the furniture part 3, could kick out in a direction of the open position in an uncontrolled manner. By the releasable blocking device 31, a movement of the actuating arm assembly 5 from the open position in a direction of the closed position can thus be blocked. In this way, a tensioning of the spring device 10 can be prevented.

As shown in FIG. 7*a*, the first blocking element 31*a*, due to the absence of the actuating device 14, can be pivoted in a counter-clockwise direction about the first pivoting axis 32*a* by a force of the force storage member 33 (not shown here). Thereby, the longer lever arm of the first blocking element 31*b* abuts against the second blocking element 31*b*, whereby the second blocking element 31*b* is pivoted about the second pivoting axis 32*b* in a clockwise direction.

The force storage member 33 for pressurizing the first blocking element 31*a* is configured to be stronger than the force storage member 33 for pressurizing the second blocking element 31*b*. Therefore, the first blocking element 31*a* can reliably move the second blocking element 31*b* about the second pivoting axis 32*b*.

Figure 7B:
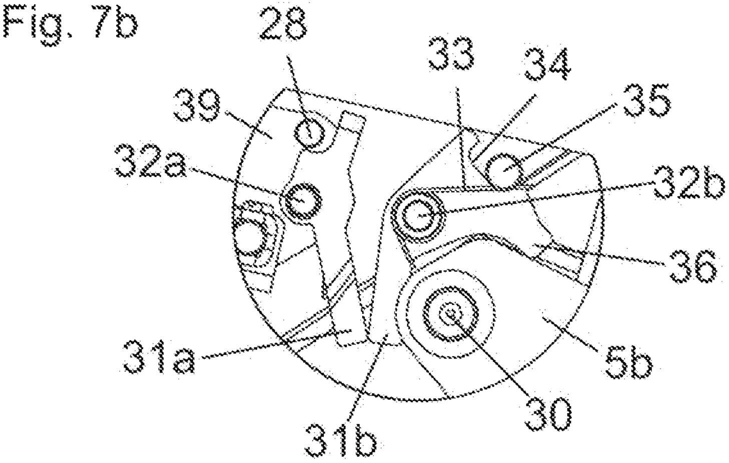

FIG. 7*b* shows the encircled region of FIG. 7*a* in an enlarged view. It can be seen that the second blocking element 31*b* includes an abutment 36 configured to abut against a counter-abutment 37 of the third actuating arm 5*c*.

Figure 7C:
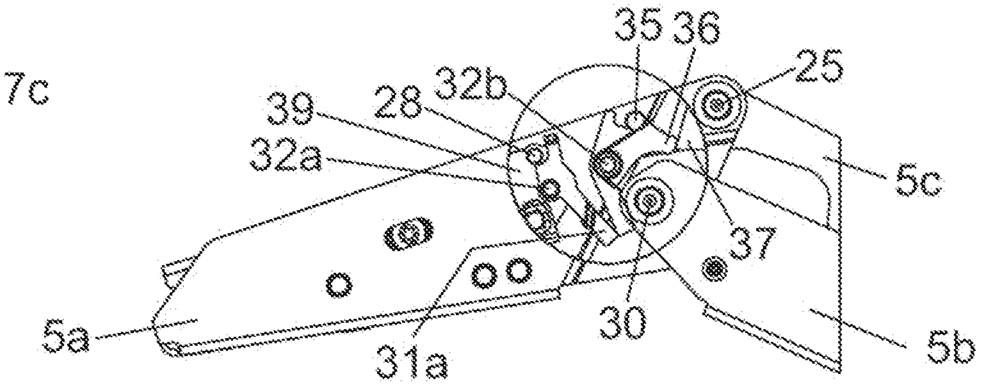

FIG. 7*c* shows a continued pivoting movement of the actuating arm assembly 5. Now, the abutment 36 of the second blocking element 31*b* abuts against the counter-abutment 37 of the actuating arm 5*c* so as to prevent a further pivoting movement of the actuating arm assembly 5 in a direction of the first relative position (closed position). In the blocking position of the blocking device 31, the actuating arm assembly 5 can thus only be moved from the position shown in FIG. 7*a* into the position shown in FIG. 7*c*, so that the spring device 10 cannot further be tensioned for safety reasons.

For the case that the actuating device 14 or the movable furniture part 3 is to be mounted to the actuating arm 5*a*, the movable blocking device 31 is again automatically switched into the unblocking position. By mounting the actuating device 14 or by mounting the movable furniture part 3 to the actuating arm 5*a*, the first blocking element 31*a* is moved, from the position shown in FIG. 7*a*, again about the first pivoting axis 32*a* in a clockwise direction. The longer lever arm of the first blocking element 31*a* is thereby again spaced from the second blocking element 31*b*. Therefore, the second blocking element 31*b* is tilted in a counter-clockwise direction by a force of the force storage member 33, thereby spacing the abutment 36 and the counter-abutment 37 from each other. In this way, the blocking position can be again released.

Figure 7D:
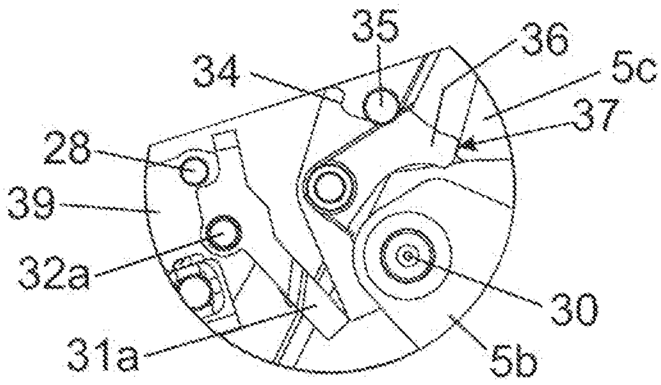

FIG. 7*d* shows the encircled region of FIG. 7*c* in an enlarged view.

Preferred embodiments:

at least one of the two blocking elements 31*a*, 31*b* of the blocking device 31 is pre-stressed by a force storage member 33, preferably both of the at least two blocking elements 31*a*, 31*b* are pre-stressed by a force storage member 33, and particularly preferred that the two blocking elements 31*a*, 31*b* of the blocking device 31 are pre-stressed by the force storage members 33 in different movement directions and/or the force storage members 33 have a different spring force, preferably at least one force storage member 33, preferably both force storage members 33, includes or include a torsion spring, and/or the at least two blocking elements 31*a*, 31*b* of the blocking device 31 are arranged on a same actuating arm 5*a* of the at least two actuating arms 5*a*, 5*b*, 5*c* of the actuating arm assembly 5, and/or one of the at least two blocking elements 31*a*, 31*b* of the blocking device 31 includes a supporting contour 34 for supporting a support element 35 of an actuating arm 5*a*, and/or one of the at least two blocking elements 31*a*, 31*b* of the blocking device 31 is supported on one of the at least two actuating arms 5*a*, 5*b*, 5*c* and includes an abutment 36 configured to bear against a counter-abutment 37 of the other of the at least two actuating arms 5*a*, 5*b*, 5*c* in the blocking position, and/or at least one of the at least two blocking elements 31*a*, 31*b* of the blocking device 31 can be moved from the blocking position into the unblocking position by mounting the actuating device 14 or by mounting a fitting element configured to be connected to the movable furniture part 3.

The invention claimed is:

1. A furniture drive for moving a movable furniture part relative to a furniture carcass, the furniture drive comprising:

a housing configured to be arranged on or within a furniture panel of the furniture carcass;

an actuating arm assembly for moving the movable furniture part, the actuating arm assembly including a first actuating arm and a second actuating arm pivotable relative to one another, the first actuating arm being movably-supported relative to the housing and to be fixed to the movable furniture part, the actuating arm assembly being movable between a first relative position corresponding to a closed position of the movable furniture part, and a second relative position corresponding to a fully open position of the movable furniture part; and a releasable blocking device configured to block a pivotal movement of the actuating arm assembly from the second relative position in a direction of the first relative position, wherein the releasable blocking device includes a movably supported blocking element configured to be moved between a blocking position and an unblocking position, a movement of the actuating arm assembly between the first relative position and the second relative position being unblocked by the blocking device when the blocking element is in the unblocking position, wherein the blocking element of the blocking device is supported on a first one of the first actuating arm and the second actuating arm, and includes an abutment configured to bear against a counter-abutment supported on a second one of the first actuating arm and the second actuating arm in the blocking position of the blocking element and in a blocking angle position of the actuating arm assembly relative to the housing, and wherein the actuating arm assembly is freely movable between the second relative position and the blocking angle position when the blocking element is in the blocking position, and a pivotal movement of the actuating arm assembly from the second relative position in a direction of the first relative position beyond the blocking angle position is blocked when the blocking element is in the blocking position.

2. The furniture drive according to claim 1, further comprising a force storage member configured to pre-stress the blocking element in a direction of the unblocking position.

3. The furniture drive according to claim 1, wherein the blocking element is a first blocking element, the releasable blocking device includes a second movably supported blocking element, the first blocking element and the second blocking element being movably supported relative to one another between the blocking position and the unblocking position, the releasable blocking device being configured to block a pivotal movement of the actuating arm assembly from the second relative position in a direction of the first relative position beyond the blocking angle position in the blocking position of the first blocking element and the second blocking element and in the blocking angle position of the actuating arm assembly relative to the housing.

4. The furniture drive according to claim 3, wherein the first blocking element and the second blocking element of the blocking device bear against one another in the blocking position, and/or are mutually spaced from one another in the unblocking position.

5. The furniture drive according to claim 3, further comprising a force storage member configured to pre-stress at least one of the first blocking element and the second blocking element of the blocking device.

6. The furniture drive according to claim 3, wherein the first blocking element and the second blocking element of the blocking device are arranged on the first actuating arm of the actuating arm assembly, and/or at least one of the first blocking element and the second blocking element of the blocking device has a supporting contour on which a supporting element of the second actuating arm is to be supported.

7. The furniture drive according to claim 1, wherein the first actuating arm includes a mounting member to be fixed to the movable furniture part, and an adjustment device configured to adjust a position of the mounting member relative to the first actuating arm, and at least one of the first blocking element and the second blocking element of the blocking device is pivotally supported on the mounting member.

8. The furniture drive according to claim 1, wherein:

the first actuating arm is arranged within the housing in the first relative position of the actuating arm assembly, and/or the first actuating arm is arranged outside the housing in the second relative position of the actuating arm assembly, and/or the furniture drive further comprises an adjustment device configured to adjust a position of the actuating arm assembly relative to the housing in the second relative position.

9. The furniture drive according to claim 1, further comprising an actuating device connected to the first actuating arm, and the actuating arm assembly is movable from the first relative position into the second relative position by the actuating device.

10. The furniture drive according to claim 9, wherein the at least one actuating device includes a recess for receiving a tool.

11. The furniture drive according to claim 9, further comprising a latching device configured to releasably latch the actuating device in the first relative position of the actuating arm assembly relative to the housing.

12. The furniture drive according to claim 9, wherein the housing has a front-sided opening and the actuating device protrudes through the front-sided opening of the housing in the first relative position of the actuating arm assembly.

13. The furniture drive according to claim 9, further comprising a locking device configured to releasably connect the actuating device to the actuating arm assembly or, alternatively, configured to releasably connect a fitting element to be connected to the movable furniture part to the actuating arm assembly.

14. The furniture drive according to claim 1, wherein the furniture drive includes a spring device configured to apply a force to the actuating arm assembly.

15. An item of furniture comprising:
a furniture carcass;
a furniture part movably-supported relative to the furniture carcass, the furniture part being a furniture flap configured to pivot relative to the furniture carcass about a horizontally extending axis; and
the furniture drive according to claim 1 configured to move the furniture flap relative to the furniture carcass,
wherein the furniture carcass includes a furniture panel, and the housing of the furniture drive is substantially entirely received within the furniture panel of the furniture carcass.

16. The furniture drive according to claim 1, wherein the movable furniture part is a furniture flap configured to pivot relative to the furniture carcass about a horizontally extending axis, and the blocking element is pivotally supported on the housing to be pivoted between the blocking position and the unblocking position.

17. The furniture drive according to claim 3, wherein the first blocking element and the second blocking element of the blocking device are pivotally supported on the housing so as to pivot relative to one another between the blocking position and the unblocking position.

18. The furniture drive according to claim 5, wherein the force storage member is one of at least two force storage members, and both of the first blocking element and the second blocking element of the blocking device are prestressed by a respective one of the at least two force storage members in different directions of movement and/or the at least two force storage members have a different spring force.

19. The furniture drive according to claim 9, wherein the blocking element of the blocking device is movable from the blocking position into the unblocking position by mounting the actuating device to the actuating arm assembly or by mounting the movable furniture part to the actuating arm assembly.

20. The furniture drive according to claim 10, wherein:
the housing has a front-sided opening and the recess extends at an incline to a plane formed by the front-sided opening in the first relative position of the actuating arm assembly, and/or
the recess has an insertion opening and an abutment for abutting the tool, the insertion opening and the abutment being mutually spaced from one another, the first actuating arm being pivotally supported about a hinge axis, and the abutment is closer to the hinge axis than the insertion opening in the first relative position of the actuating arm assembly, and/or
the recess is substantially cylindrical and/or conical, and/or
the second actuating arm being configured to be connected to the movable furniture part, and the tool configured to be received within the recess can be arranged in an extension of the second actuating arm.

21. The furniture drive according to claim 11, wherein:
the latching device includes at least two spring tongues mutually spaced from one another, and/or
the latching device includes a recess and a latching element configured to be arranged within the recess, the latching element being arranged on the actuating device, and the recess being arranged on or within the housing of the furniture drive, or vice versa.

22. The furniture drive according to claim 13, wherein the locking device:
includes a resilient or a spring-loaded locking element and a recess for receiving the locking element, the locking element being arranged on the first actuating arm and the recess being arranged on the actuating device or on the fitting element, or vice versa, and/or
includes a holding pin and a notch for receiving the holding pin, the holding pin being arranged on the first actuating arm and the notch being arranged on the actuating device or on the fitting element, or vice versa, and/or
includes a resilient or a spring-loaded locking element and a holding pin spaced from the a locking element.

23. The furniture drive according to claim 14, wherein:
the actuating arm assembly is pressurized by the spring device within a first pivotal angle range in a direction of the first relative position, and is pressurized by the spring device within a second pivotal angle range in a direction of the second relative position, and/or
the spring device includes a compression spring.

* * * * *